(12) United States Patent
D'Anjou et al.

(10) Patent No.: US 6,343,297 B1
(45) Date of Patent: Jan. 29, 2002

(54) METHODS, SYSTEMS AND COMPUTER PROGRAM PRODUCTS FOR PROVIDING DOCUMENT MANAGEMENT FOR SOFTWARE DEVELOPMENT SYSTEMS

(75) Inventors: James F. D'Anjou, Morgan Hill, CA (US); Lynn Cleveland Percival, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,449

(22) Filed: Dec. 30, 1998

(51) Int. Cl.$^7$ ............................................... G06F 17/30
(52) U.S. Cl. ............................ 707/104; 707/4; 707/10; 707/500
(58) Field of Search ................................. 707/200, 201, 707/104.1, 202, 511, 6, 104, 10; 345/331; 709/201; 706/45

(56) References Cited

U.S. PATENT DOCUMENTS

| | | | | |
|---|---|---|---|---|
| 4,558,413 A | | 12/1985 | Schmidt et al. ............... | 707/203 |
| 5,193,185 A | | 3/1993 | Lanter ......................... | 707/101 |
| 5,515,491 A | * | 5/1996 | Bates et al. .................. | 345/331 |
| 5,655,130 A | * | 8/1997 | Dodge et al. ................ | 707/511 |
| 5,701,400 A | * | 12/1997 | Amado ......................... | 706/45 |
| 5,767,848 A | * | 6/1998 | Matsuzaki et al. ........... | 345/331 |
| 5,812,849 A | | 9/1998 | Nykiel et al. .................. | 717/1 |
| 5,835,701 A | | 11/1998 | Hastings ....................... | 714/35 |
| 5,835,911 A | | 11/1998 | Nakagawa et al. .......... | 707/203 |
| 5,862,386 A | | 1/1999 | Joseph et al. .................. | 717/11 |
| 5,903,897 A | | 5/1999 | Carrier, III et al. .......... | 707/203 |
| 5,991,534 A | | 11/1999 | Hamilton et al. .............. | 717/1 |
| 6,003,042 A | | 12/1999 | Melahn ......................... | 707/203 |
| 6,195,658 B1 | * | 2/2001 | Comito et al. .................. | 707/6 |
| 6,195,795 B1 | | 2/2001 | Block et al. ................... | 717/11 |

OTHER PUBLICATIONS

Aimee G. Do, "The Impact of Configuration Management During the Software Product's Lifecycle." Digital Avionics Sys. Proc. vol. 1, IEEE, pp. 1S 4–1–4–8.

Richard Cooper, "Persistant Languages Facilitate the Implementation of Software Version Management." System Science, SW Tracks, proc. of 22$^{nd}$ annual Hawaii Int. Conf. vol. 2, IEEE, pp. 56–65.

Randal Burns and Inderpal Narang, "Version Management and Recoverability for Large Object Data." Multimedia DBMS IEEE, proc. international workshop, pp. 12–19.

* cited by examiner

*Primary Examiner*—Diane Mizrahi
(74) *Attorney, Agent, or Firm*—Myers Bigel Sibley & Sajovec

(57) ABSTRACT

Methods, systems and computer program products are provided which provide a document management system suitable for incorporation with a software management and control library by encapsulating a plurality of document databases with a template so as to provide a document database which interacts with the software management and control library. In particular, the plurality of document databases are defined utilizing the template. Furthermore, it is preferred that the template be utilized to define a requirements document database, define a design and development document database and define a test document database.

24 Claims, 9 Drawing Sheets

METHODS, SYSTEMS AND COMPUTER PROGRAM PRODUCTS FOR PROVIDING DOCUMENT MANAGEMENT FOR SOFTWARE DEVELOPMENT SYSTEMS

RELATED APPLICATIONS

This application is related to concurrently filed and commonly assigned U.S. patent application Ser. No. 09/223,253, entitled SYSTEMS, METHODS AND COMPUTER PROGRAM PRODUCTS FOR END-TO-END SOFTWARE DEVELOPMENT PROCESS AUTOMATION.

FIELD OF THE INVENTION

This invention relates generally to computer systems, methods, and program products, and more particularly to computer systems, methods, and program products for software development.

BACKGROUND OF THE INVENTION

Object oriented programming is a computer programming packaging technique which provides reusable and easily expandable programs. In a traditional procedural program, emphasis is placed on methods to be conducted on particular data sets. By contrast, in an object oriented program, emphasis is placed on data. As is well known to those having skill in the art of object oriented programming, object oriented programs are composed of various types of "objects".

An object is a data structure, also referred to as a "frame", and a set of operations or functions, also referred to as "methods", for accessing and manipulating the data structure. Objects having identical data structures and common behavior can be grouped together into, and collectively identified as a "class." Objects are instances created from a particular class. Each object inherits the data structure and methods of the particular class from which it was instantiated. A hierarchical inheritance relationship exists between multiple classes. For example, one class may be considered a "parent" of another class (the "child" of the parent class). The child class is said to be "derived" from the parent class and inherits all of the attributes and methods of the parent class.

Increasingly, developers are utilizing a team approach in developing object oriented program applications. Component-based development is quickly becoming the focus of many new development efforts. In this type of development, team members working on an application share components stored in libraries to build applications. Components are basically encapsulated software objects, or specifications capable of creating such objects, providing some type of known service that can be used in combination with other components to build applications.

TeamConnection is a software product of International Business Machines, Inc. that provides a team development environment that includes the following: configuration management; version management; change management; and build support for developing multi-tier, multi-language applications across platforms. TeamConnection provides a single repository for development data including reusable parts such as JavaBeans and ActiveX, source code such as C++, COBOL and Java, web applets, HTML documents, end user documentation, test cases, and modeled objects.

TeamConnection facilitates parallel development involving multiple developers. Various mechanisms are provided for allowing developers to access the same objects or components in a corresponding library at the same time without negatively affecting the work of others. TeamConnection also mediates changes made to objects by multiple developers and for controlling the versions of objects stored in the library.

TeamConnection manages development utilizing "parts" which are uniquely named and "versioned" objects stored in TeamConnection. As is known to those skilled in the art of object oriented programming, TeamConnection provides an open model for using classes to create managed objects. A part class can be subclassed by applications to create versioned objects for application specific purposes. TeamConnection supports the development of client/server and distributed applications on Multiple Virtual Storage (MVS), OS/2, Unix and Windows operating systems, and can be configured as stand-alone, or in LAN-based client/server mode.

Developers utilizing the TeamConnection environment, are permitted to "check-out" parts from the TeamConnection repository to a work area. A work area is used by developers to modify existing parts and create new parts for an application. To retrieve a part from TeamConnection, a developer uses an application that checks out the part and brings over the part contents in some form that the user can work with. For example, for a part that stores C++ source code, the application would be one that retrieved the contents into a file so the developer could employ a text editor to modify the C++ source code. Then, when the changes are complete, the developer uses the same application to move the new contents back into TeamConnection. The developer then asks TeamConnection to build the C++ code into an executable. TeamConnection gives the contents of the part to a C++ compiler to produce the executable which is then saved in TeamConnection. The developer can now retrieve and test the executable.

While TeamConnection allows for the efficient management of software libraries, TeamConnection does not provide for tracking documentation which may underlie the entire software development process. Such documentation is typically tracked and managed in a separate system which is isolated from the software library and configuration control tool such as TeamConnection. Thus, while many software development teams may realize the need for a software library and configuration control tool as they develop more complex applications, other intellectual assets of the team, such as technical documentation may be scattered in a wide variety of mediums which are typically not well synchronized with the actual implementation of the software product. For example, users may not know the status of development as it relates to design specifications or other technical information during the development process. Without this information, it may be difficult, if not impossible, to track the status of particular requirements or designs through the development process and relate versions of software back to the specific requirements that resulted in the software being developed. This inability to track status may be a disadvantage if the development team is to be expanded to include more than the software developers such as to include marketing, technical writers and system architects. Furthermore, without a traceable audit process it may be difficult to achieve certification, such as ISO9000 or other certification standards.

SUMMARY OF THE INVENTION

In view of the above discussion, it is an object of the present invention to provide improved tracking of software development.

A further object of the present invention is to provide a system which allows coordination beyond traditional software developers.

Yet another object of the present invention is to provide a single system which may be used in differing aspects of the development process without redesigning the development system.

Still another object of the present invention is to provide a system development system which is flexible and allows for differing development strategies.

These and other objects of the present invention are provided by methods, systems and computer program products which provide a document management system suitable for incorporation with a software management and control library by encapsulating a plurality of document databases with a template so as to provide a document database which interacts with the software management and control library. In particular, the plurality of document databases are defined utilizing the template. Furthermore, it is preferred that the template be utilized to define a requirements document database, define a design and development document database and define a test document database.

By incorporating the definitions of the database under a single template, the present invention provides for flexibility in differing software development environments which still presenting the user or system administrator with a single documentation entity having commonality across the differing databases. Thus, the look and feel of a single database may be maintained while the flexibility of multiple databases with tailored definitions may be provided.

In particular embodiment of the present invention, the requirements document database definition includes defining a requirements document for storing requirements information in the requirements document database and defining a feature document for storing in the requirements document database feature information associated with requirements documents stored in the requirements documents database. As used herein, a "feature" denotes an enhancement or improvement-driven unit of work for software development. The design and development document data base definition may further include defining a design document for storing design information in the design and development document database, defining a low level design document for storing additional design information associated with design documents in the design and development database, defining a change document for storing design change information associated with at least one of a design document and a low level design document stored in the design and development database and defining a feature document for storing in the design and development document database, feature information associated with design documents, low level design documents or change documents stored in the design and development database. The test document database defining may further include defining a test case document for storing test case information in the test case document database, defining an execution record document for storing in the test document database, execution information associated with a test case document stored in the test document database and defining a defect document for storing in the test document database, defect information associated with execution records stored in the test document database. As used herein, a "defect" denotes a problem-driven unit of work for software development.

In a further embodiment of the present invention, each of the defined documents includes a link field for associating documents created by the definition with another document.

Furthermore, a plurality of user authority levels associated with the plurality of document databases may be defined by the template. The plurality of user authority levels define access and control rights associated with documents stored in the plurality of databases. Also, a plurality of allowed status states may be defined by the template for at least one document definition for the requirement documents database, the design and development documents database or the test database. Actions allowed for documents created using the document definitions may then also be defined by the template so as to control the allowed actions based on a combination of the status state of the created document and a user authority level associated with a user accessing the created document.

The template may also define a form format for use in accessing documents from each of the plurality of databases. Preferably, the form format includes at least one predefined subform and at least one user defined subform.

In a preferred embodiment, the template is a Lotus Notes template.

It will be understood by those having skill in the art that the present invention may be generalized to provide a general database schema that can be adapted to database applications other than software management and document databases. Thus, users may define databases to be encapsulated with a template to thereby define relationships among databases. As will be appreciated by those of skill in the art, the present invention may be provided as methods, systems and computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
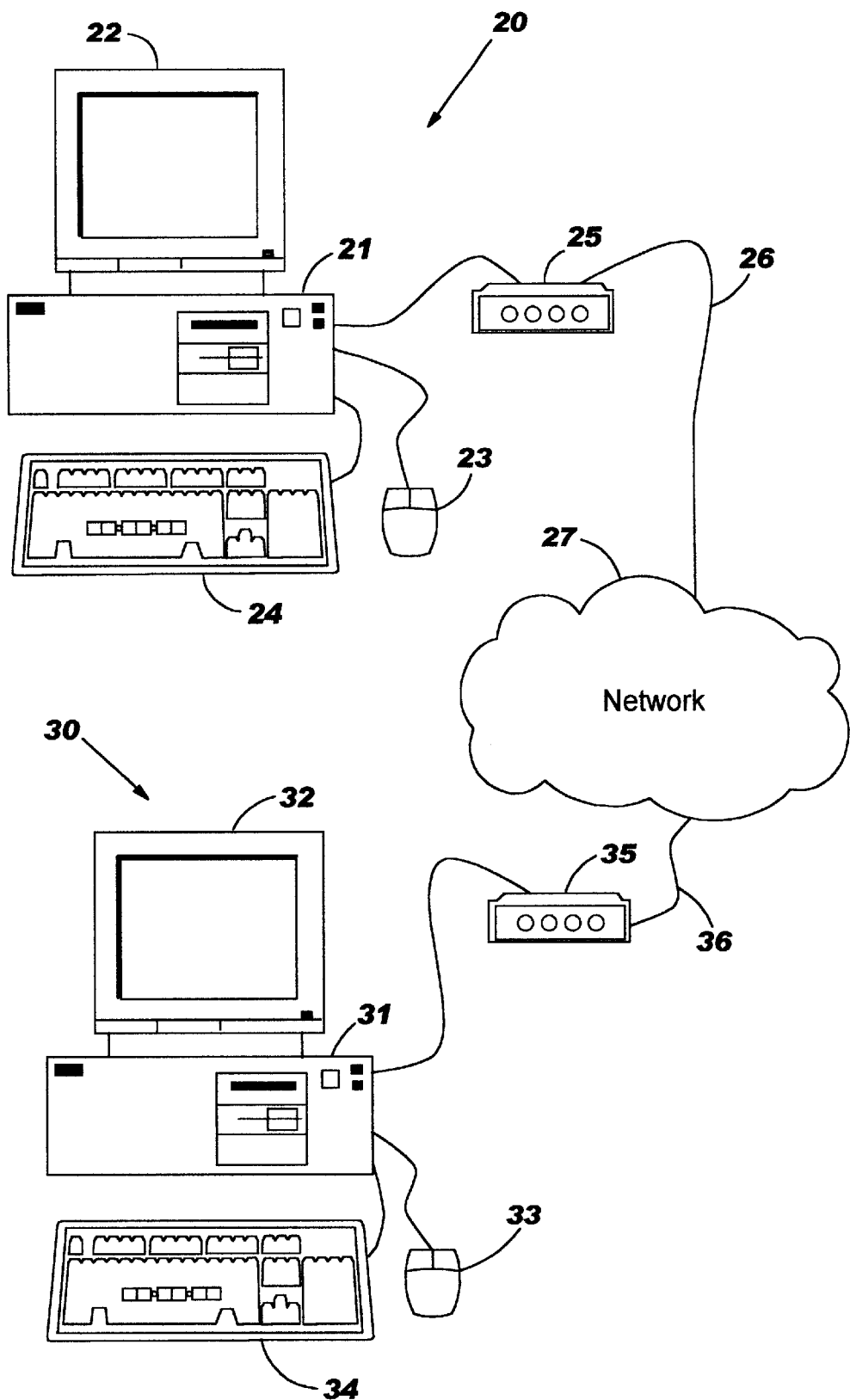
FIG. 1 schematically illustrates a hardware environment in which the present invention may operate.

The present invention provides for end-to-end software development process automaton by integrating technical documentation and software library management into a single system. Such end-to-end development control may be provided in a preferred embodiment using Lotus® Notes® (IBM) in conjunction with VisualAge™ TeamConnection™ to provide integrated document management and software development library management. FIG. 1 illustrates one operating environment in which the end-to-end software development process according to the present invention may be utilized.

As is illustrated in FIG. 1, users may access a network having shared resources or may operate in a standalone mode. In either case a user may execute an operating environment suitable for utilizing the end-to-end software development automation process according to the present invention running on a computer 20. Computer 20 may include, but is not limited to, Apple®, IBM®, or IBM-compatible personal computers or other data processing systems known to those of skill in the art. Computer 20 preferably includes a central processing unit 21, a display 22, a pointing device 23, a keyboard 24, a communications device 25 (such as a modem or network interface), and a connection 26 for connecting to a network 27. The keyboard 24, having a plurality of keys thereon, is in communication with the central processing unit 21. A pointing device 23, such as a mouse, is also connected to the central processing unit 21. The network connection 26 may be made via traditional phone lines, an ISDN link, a T1 link, a T3 link, via cable television, via a network adapter card (NIC) such as an ethernet adapter, a Token Ring™ (IBM) adapter or the like.

The central processing unit 21 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during execution of processing environments such as object oriented environments on computer 20 to store various data and program instructions.

Preferably, computer 20 has an Intel® Pentium® processor (or equivalent) with at least thirty-two megabytes (32 MB) of RAM, and at least five megabytes (5 MB) of persistent computer storage for caching. Even more preferable is an Intel® Pentium II® processor (or equivalent). However, it is to be understood that various processors may be utilized to carry out the present invention without being limited to those enumerated herein. Computer 20, if an IBM®, or IBM-compatible personal computer, preferably utilizes either a Windows® 3.1, Windows 95®, Windows 98®, Windows NT®, Unix®, or OS/2® operating system.

Furthermore, it is to be understood that a device not having computational capability, or having limited computational capability, may be utilized in accordance with the present invention for retrieving content through a network where the execution of the program instructions of the operating environment are executed remote from the workstation of the user. Thus, the present invention may also be utilized in "mainframe" systems where a plurality of terminals share a processing system. Such systems are well known to those of skill in the art and, therefore, will not be described in detail herein.

In a networking environment, the present invention may be utilized in client/server or other such network environments, including intranet, extranet, and Internet environments utilizing Transport Control Protocol/Internet Protocol (TCP/IP) communications, Asynchronous Transfer Mode (ATM) or other such interconnection and communication protocols which allow communication between computers such as between a computer 20 and computer 30.

Computer 30 may have a configuration similar to that of a computer 20 and may include a central processing unit 31, a display 32, a pointing device 33, a keyboard 34, a communications device 35, and a network connection 36 for connecting to the network 27. However, computer 30 may be configure in the same manner or in a different manner than computer 20. Accordingly, the present invention may be utilized in a homogeneous or a heterogenous network. For example, computer 30 may be implemented using other processors and via other computing devices, including, but not limited to, mainframe computing systems and minicomputers.

Figure 2:
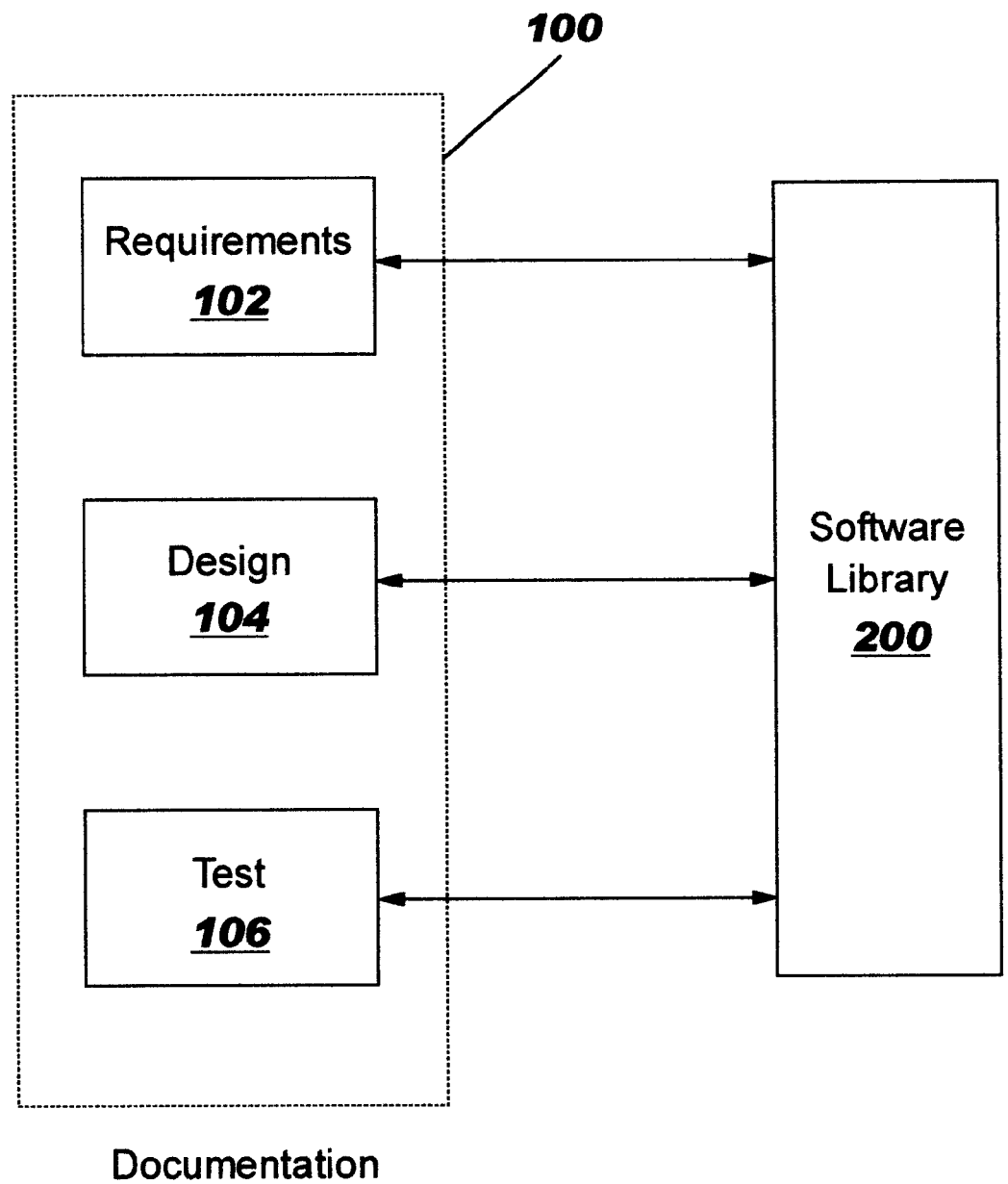
FIG. 2 is a block diagram of an end-to-end software development system according to the present invention.

FIG. 2 illustrates one architecture according to the present invention where technical documentation is linked to a software library to provide tracking and status of the software development process as it relates to the technical documentation which resulted in the generation of code, parts, objects, drivers, releases or other software development steps reflected in the software development library. As seen in FIG. 2, a technical document database 100 may be comprised of a plurality of databases such as the requirements document database 102, the design documents database 104 and the test documents database 106. The technical documents database 100 organizes and links the requirements documents in the requirements documents database 102 the design documents in the design documents database 104 and the test documents in the test documents database 106 with the software library management and control software 200 via a change mechanism, such as a feature and defect tracking mechanism. Changes in the software library 200 are, thereby, associated with the technical documents store in the database 102, 104, and 106 which generated those changes. Furthermore, the status of the changes as they move through the development process in the software library is reported back to the respective database of the technical documentation database 100 so that the status of a change may be tracked with reference to the technical document or documents which generated the change.

Figure 3:
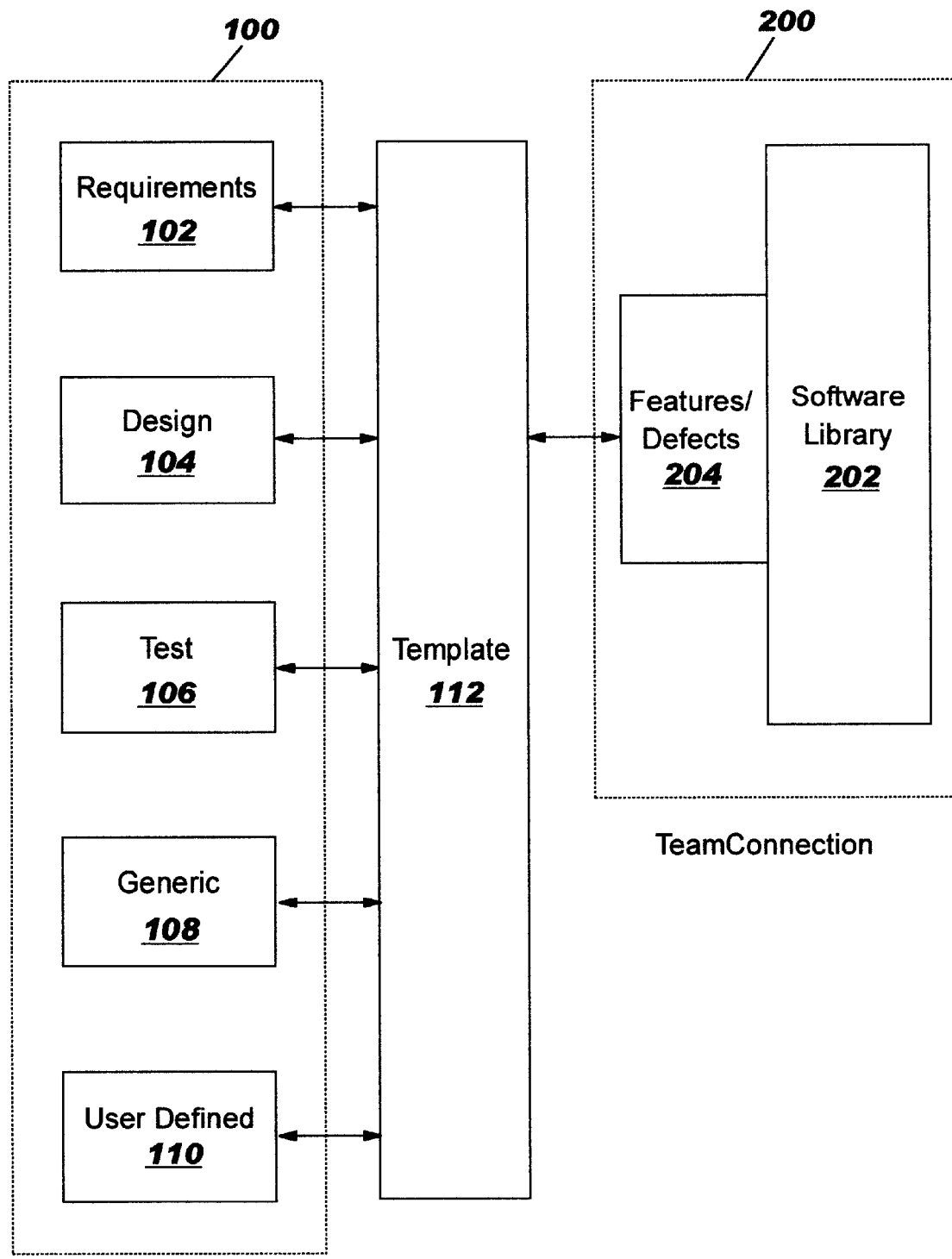
FIG. 3 is a block diagram of a preferred embodiment of the system of FIG. 2.

FIG. 3 illustrates a preferred embodiment of FIG. 2 where a single Lotus Notes template 112 is utilized to encapsulate multiple databases in a single database 100. Also the template provides for linking and tracking to a TeamConnection software library 200, which includes the TeamConnection library management features 202 as well as the TeamConnection features and defects change management function 204.

Technical document management through Notes support is encapsulated in a single Notes database template 112 that can serve many roles in the application development process. A Notes template is a skeleton that contains design elements, but not documents. A Notes template may be used to create a database where the database receives the design elements of the template which may then be customized using well known Lotus Notes programming techniques. Thus, a user may, through a straightforward database setup process, decide how to apply the Notes database in a particular organization and customize a basic Notes template. Preferably, the base Notes template has built in layouts for dealing with requirements, design documentation, and test case definitions. Customization permits layout and organization of documents to fit a particular organization. However, such modifications may vary from organization to organization and will be readily apparent to one of skill in the art in light of the present disclosure and, therefore, only the base Notes template will be described herein.

As is briefly described above, the tie to TeamConnection 200 is through its Feature and Defect objects 204. New defects and features may be opened from the Notes database 100 so that they can be logically related to Notes documents. The Notes database 100 is kept current with the TeamConnection database 200 through a reconciliation process that can be run either automatically or on demand. Furthermore, the TeamConnection internet browser support allows Notes users to access all TeamConnection information from within Notes. Notes databases 100 can be published for browsing on an intranet using facilities that are provided by Lotus Domino, the HTTP server component of Lotus Notes. Thus, users without access to Notes may also be provided information in the document database 100. Furthermore, access can be strictly controlled through the features of Lotus Domino.

By utilizing an established document database management system such as Notes, built in Notes functions may allow viewing and monitoring of the progress of development and testing efforts. For example, as briefly described above, a list of features in TeamConnection representing the implementation of a specific design may be maintained. These features may be linked to technical documents in the technical document database 100 so as to monitor the implementation progress with respect to the design documents. Similarly, defects opened in TeamConnection can be linked to test cases in the test database 106 to monitor testing progress. Moreover, related documents within the technical documents database 100 may be linked and a history of document changes maintained.

A review cycle feature of Notes allows documents to be circulated among colleagues and end users for comment and review. The reviewers are invited by e-mail to participate and a copy of the document with their comments can be saved and referenced in the technical database 100.

Furthermore, the use of Notes may also provide for security and authorization privileges which may be defined on a custom basis or utilizing the defaults of the base template 112. For instance, only project leaders may be authorized to approve documents and only approved documents may be allowed to have features open in TeamConnection. Such authority levels may be used to insure that implementation does not proceed until a design is ready for implementation. Authority levels are well known to those having skill in the art of workflow management and will not be described further herein.

As mentioned above and as described in more detail below, a single database template 112 contains all the information for defining a Lotus Notes database 100 to be used for requirements, development, or testing. The template may be used to generate one or all of a requirements database 102, a design and development database 104, and a testing database 106. The database template 112 may also be utilized to generate custom databases such as the generic database 108 and the user defined database 110 which may be included in the technical documentation database 100. Such databases are optional and may vary from implementation to implementation. The details of such databases will depend on a particular users development process. Accordingly, these databases will not be described further herein.

The template 112 may be utilized to generate a Notes requirements database 102 which allows users to define application requirements. Technical evaluations of the requirement can be entered as well. As discussed in more detail below, requirements can be prioritized and assigned different states (like Accepted, Rejected, Deferred). For requirements which are chosen to implement, a TeamConnection feature can be defined to initiate the implementation and maintain a link back to the original requirement, which the implementor can refer to.

The template 112 may also be utilized to generate a Notes design and development database 104 which supports a variety of technical documents like design specifications and design changes. These design and development documents can be arranged in a hierarchy to allow for high level and lower level documents. TeamConnection features and defects can be opened and assigned to these documents to track implementation.

The template 112 may also be utilized to generate a Notes testing database 106 which allows for definition of test cases and recording of specific executions of these test cases. TeamConnection defects can be opened for failed execution attempts and a link to the test case may be maintained. Test progress can be monitored from the variety of views that are available.

Figure 4:
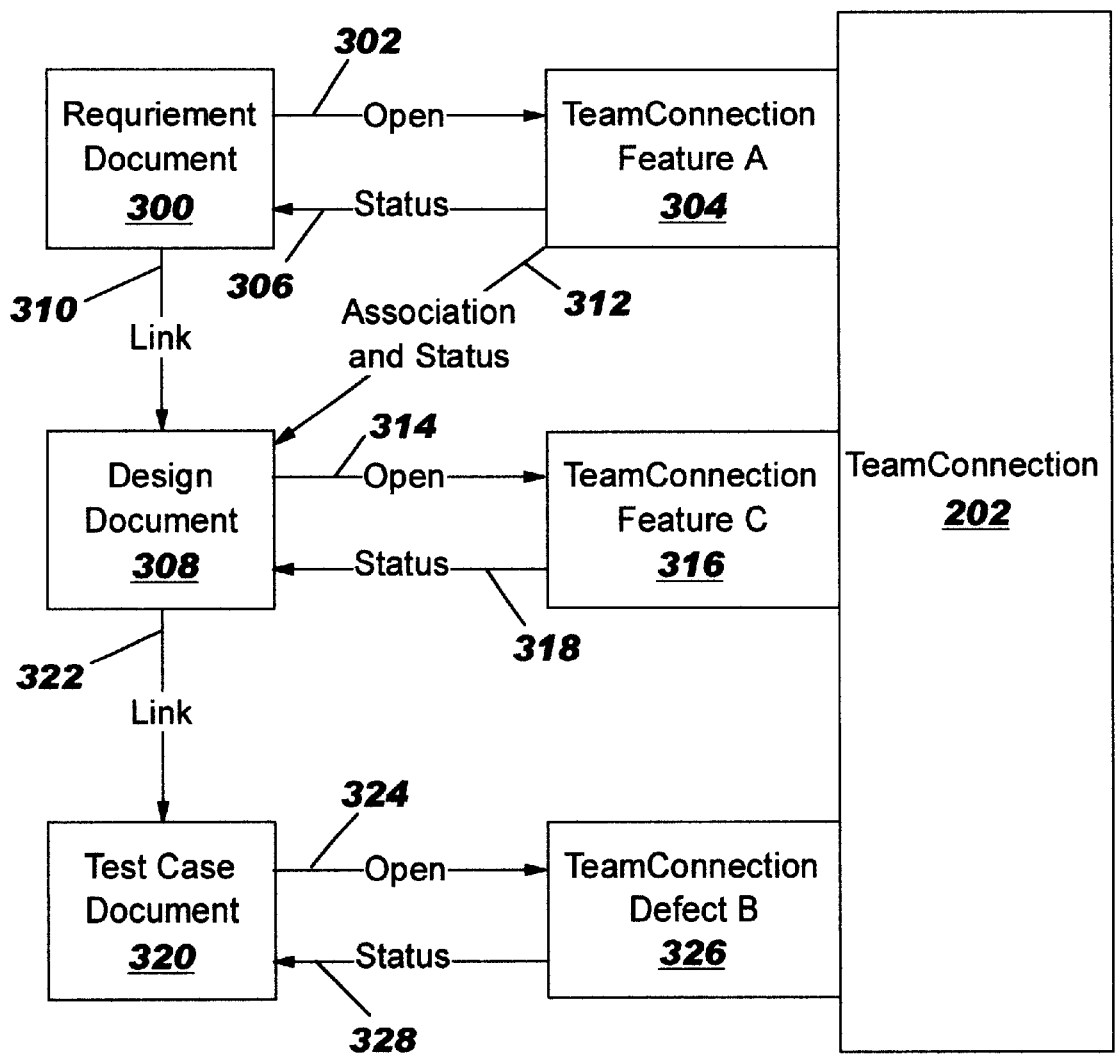
FIG. 4 is a block diagram illustrating operations of an exemplary development cycle utilizing the present invention.

As is illustrated in more detail in FIG. 4, any or all of the Notes databases 102, 104, 106, 108, and 110 in the technical documentation database 100 may be used and synchronized with TeamConnection 200. FIG. 4 illustrates a portion of an exemplary development process utilizing the present invention. FIG. 4 further illustrates how Notes built-in capabilities to link documents across different databases may be used to link a requirements document in one database to the design document in another database. Test cases can be linked to the design document that they are intended to test. Design documentation may also be linked to the implementation in TeamConnection. Testing may also be linked to defects recorded in TeamConnection. Furthermore, while the present invention will be described with respect to particular exemplary document types, because Lotus Notes can support a variety of documents, other information like plans, schedules, and processes can be included in Notes databases as well.

As is seen in FIG. 4, a requirement document 300 may be generated by a user. If the requirement document results in the need for a feature in the software being developed, then an open 302 of a TeamConnection feature object 304 is performed to generate a feature in TeamConnection which is associated with the requirement document 300. Status 306 of the feature 304 may be obtained from TeamConnection and linked to the requirement document 300 which generated the feature object 304.

The requirement document 300 may also result in the generation of design and development documents such as design document 308. The relationship between requirement document 300 and design document 308 is reflected by link 310 in FIG. 4. Furthermore, if design document 308 relates to the feature object 304 which was generated as a result of requirement document 300, then a link or association 312 between design document 308 and feature object 304 may also be established and the status of feature 304 tracked in relation to design document 308 as well.

If design document 308 further requires additional features or changes in the software being developed, then design document 308 may also generate a feature object in TeamConnection by an open 314 of feature object 316 which opens the feature object 316 and links the feature object 316 to the design document 308 which generated the feature object. Status 318 of feature object 316 may then be returned to design document 308 to track the status of feature object 316 as it relates to design document 308.

With a design in place, test cases may be written and stored as test case documents. If design document 308 generated test cases, test case documents 320 may be generated and linked to design document 308 with link 322. Thus, the relationship between a test case and the design which generated the test case may be maintained. If a defect is identified, then a defect object 326 may be opened 324 by test case document 320. Thus, the defect object 326 may be linked to the test case document 320 which opened it so that status 328 may be returned and associated with the test case document 320.

The process of generating technical documents, linking technical documents to feature or defect object in Team-Connection and linking technical documents among each other may be repeated for each technical document associated with the software development process. Thus, the technical documentation may be associated with each other and with the software library utilizing the Notes database 100 managed through the template 112 and integrated with the TeamConnection database 202 through the feature and defect objects 204 of TeamConnection.

Figure 5:
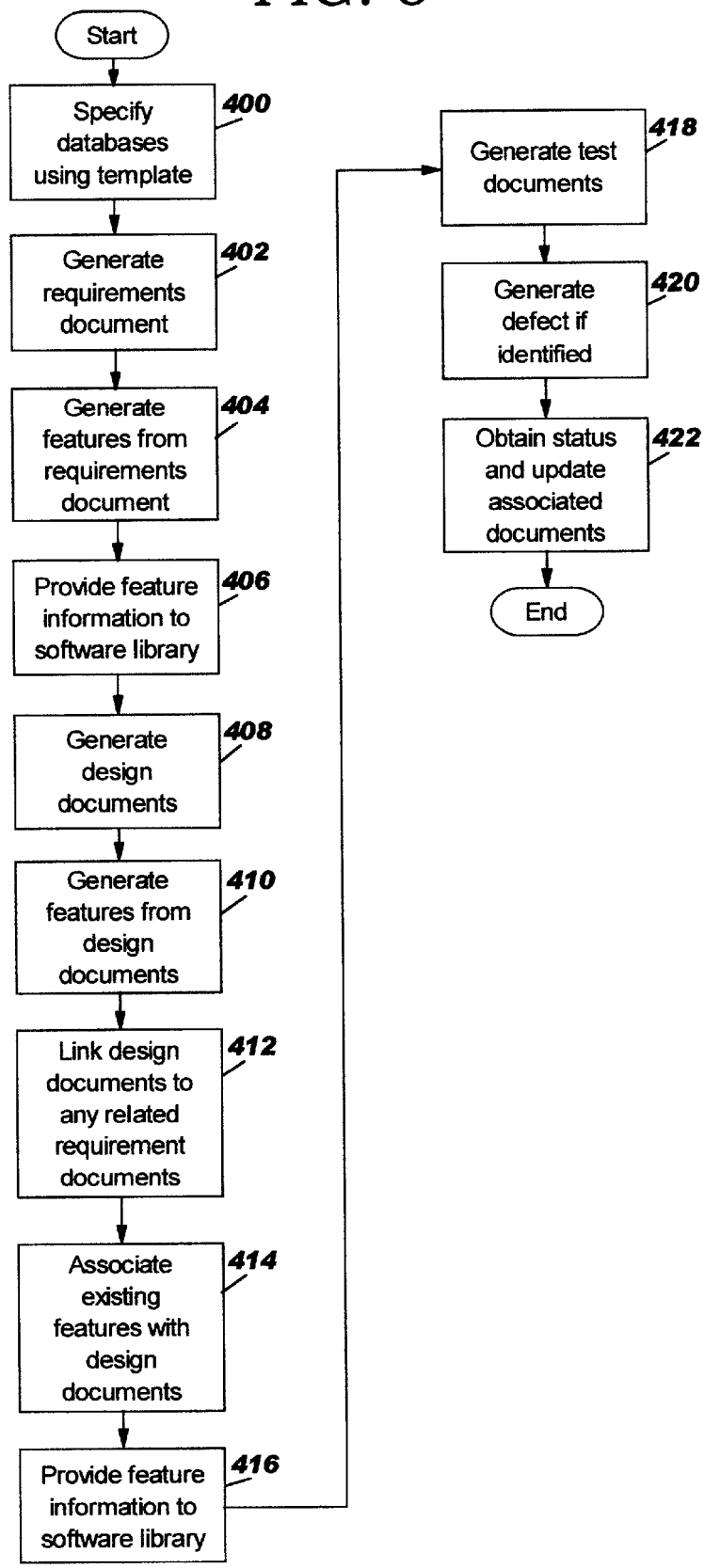
FIG. 5 is a flow chart illustrating operations of one embodiment of the present invention.

This general development process is illustrated in FIG. 5. While the blocks in FIG. 5 are illustrated as sequential operations, as will be appreciated by those of skill in the art, the operations of FIG. 5 may be performed in parallel and in various combinations of parallel and serial fashion. For example, after a feature object is generated, the status of the feature object may be checked or periodically reported back to the generating document at any time. Similarly, multiple generation of documents may occur concurrently. Thus, for example, design documents may be generated concurrently with requirements documents, other design documents or test case documents. Accordingly, the present invention should not be construed as limited to the particular sequence illustrated in FIG. 5.

As seen in FIG. 5, a user or administrator first specifies the databases, as described above, for the technical documentation utilizing the template 112 (block 400). The TeamConnection library system 200 is also preferably set up at this time. A user may then generate a requirements document (block 402). The requirements document may then generate a feature or features (block 404) which would result in TeamConnection feature objects being opened in TeamConnection (block 406) and linked to the requirements document which generated the feature.

The user may also generate a design document (block 408) which may also generate a feature or features (block 410). The design document may also be linked to any related requirements documents (block 412). Furthermore, the design document may be linked to any existing feature objects opened by other design documents or requirements documents (block 414). The features generated by the design document may also be linked to TeamConnection by opening feature objects corresponding to the features (block 416).

The user may also generate test documents which may include test cases or the like (block 418). If the test cases identify a defect, then a defect object may be opened with Team Connection (block 420) to track the defect and relate it back to the test case document which identified the defect.

As with each of the differing document types and feature or defect objects, status may be obtained, either from documents within the technical documents database 100 or from the TeamConnection library management 200 and associated with the documents which related to the status (block 422).

The template 112 may define user types with differing levels of authority. These authority levels may include "administrator authority" which may be used for setup of the database and for other administrative functions such as to reconcile the database with TeamConnection. The administrator authority level should have Notes access authority which includes document delete authority. A second, "project leader" level of authority is also provided. Project leader authority allows the user to set documents to restricted status, such as the approved state. Project leader authority should include Notes authorities of "editor" and "author" roles. Finally, the "author" level of authority allows a user to create documents, and may be required for the document numbering system of Notes to function properly. For the author authority level, the "Author Role" is preferably set in addition to the Notes Author Access authority level. Other levels of authority may also be defined, however, the template 112 preferably includes at least these three levels of authority.

The documents provided by the template 112 preferably include common properties so as to provide a consistent look and feel to the documents whether they be requirement documents, design documents or test case documents. In particular, the document set preferably includes two main documents and six response document types although other combinations may be utilized. Each of the databases may organize these document types for its particular use. A "basic" document as well as a "response" document and a "response to response" document may also be provided for all databases general use. Document types may be activated and deactivated and document relationships may be defined for the differing document types. User defined data points may also be provided.

Preferably, the documents include a common "top" portion of the document which includes the name of any authors, the document categorization, an explicit set of document states and a document control number. A "middle" portion of the document may be provided for each database. A common "bottom" portion of the document may also be provided which would include the document history, links to subordinate documents and links to TeamConnection features and/or defects. Furthermore, the document may be marked public or private. If private, then the document may only be accessible to an author of the document.

Figure 6:
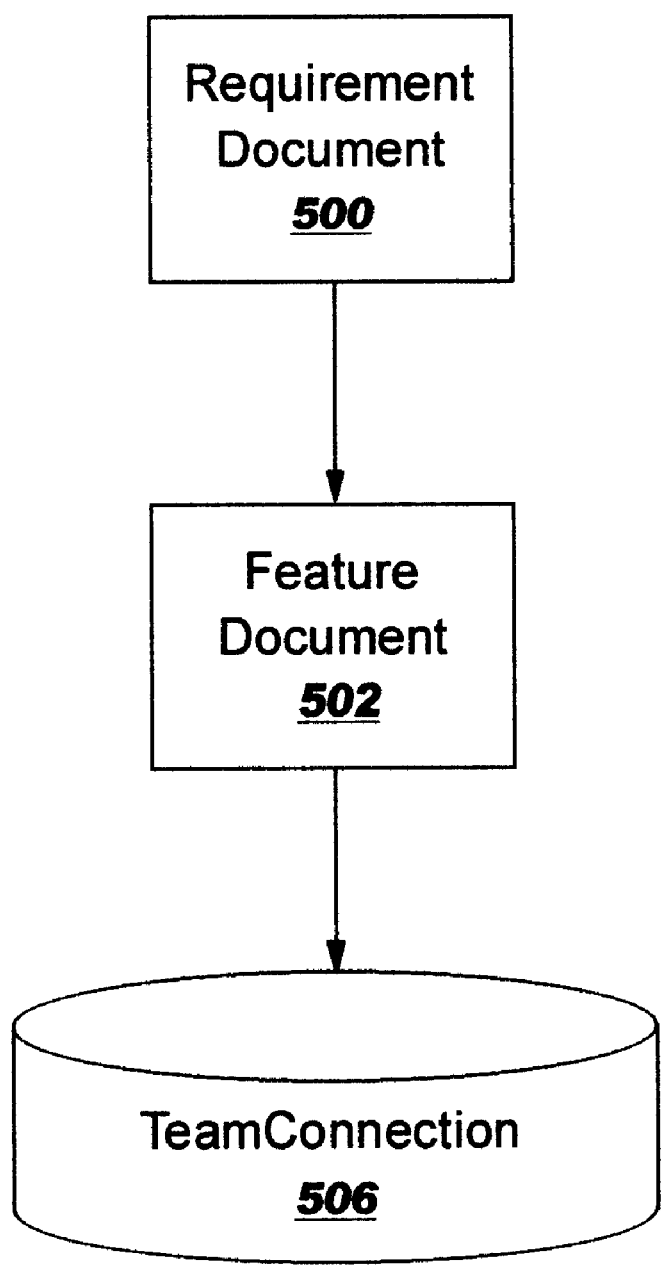
FIG. 6 is a flow diagram illustrating requirement document generation and software library interaction for a requirement document utilizing the present invention.

The various documents provided by the template 112 will now be described in further detail as they relate to their interaction with the TeamConnection library manager 200. FIG. 6 is a flow diagram of a requirement document 500 and illustrates how a requirement document may generate and be linked to a feature document 502 which may generate or open a feature object in TeamConnection 506. The requirement document may have the states and authorities as described below in Table 1.

TABLE 1

Requirements Document States

| Document States | Set By | Create Feature |
|---|---|---|
| New | Author | No |
| Under Review | Author | No |
| Sizing Estimate | Author | No |
| Final Review | Author | No |
| Accepted | Project Leader | Yes |
| Implemented | Project Leader | No |
| Deferred | Project Leader | No |
| Rejected | Project Leader | No |
| Duplicate | Project Leader | No |
| Obsolete | Project Leader | No |

The differing states of a requirement document provided by the template 112 may be further customized within the Notes environment.

Figure 7:
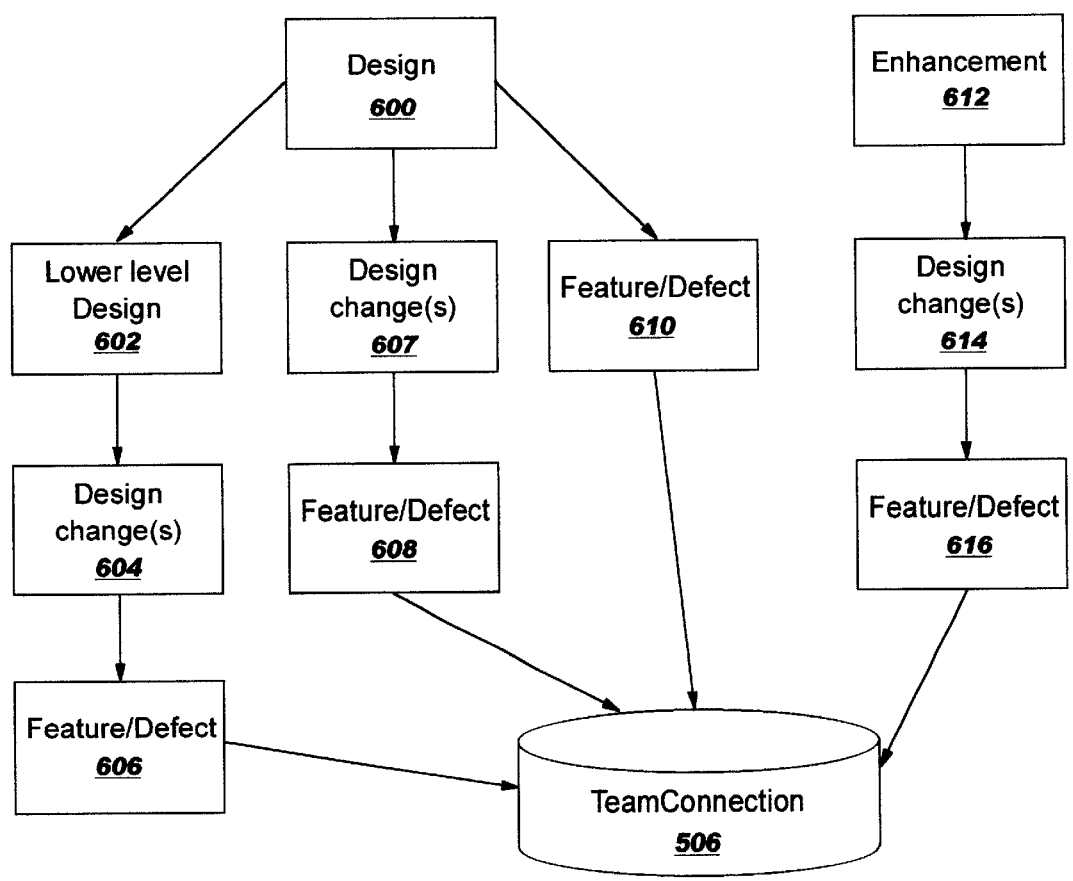
FIG. 7 is a flow diagram of design and enhancement document generation and software library interaction for a design and enhancement document utilizing the present invention.

FIG. 7 is a flow diagram of a design and development document 600 and an enhancement document 612 and illustrates how differing design and development documents and enhancement documents may generate and be linked to feature or defect documents which may be result in an open of a feature object or defect object in TeamConnection 506. As seen in FIG. 7, a design document 600 may generate a lower level design document 602 which may itself generated a design change document 604. The design change document 604 may generate a feature or defect document 606 which would open the feature or defect object with TeamConnection 506. Alternatively, a design document 600 may directly generate a design change document 607 which would generate a feature or defect document 608 which would open the feature or defect object with TeamConnection 506. Finally, a design document 600 may directly generate a feature or defect document 610 which would open a feature or defect object with TeamConnection 506. Thus, the design document hierarchy may be tailored to the particular circumstances in the development process to reflect the history of the generation of the feature or defect objects in TeamConnection 506.

FIG. 7 also shows a simplified enhancement document hierarchy which may be used in place of or in addition to the design document hierarchy. The enhancement document 612 may generate a design change document or documents 614 which generate a feature or defect document 616 which open a feature or defect object in TeamConnection 506. Alternatively, the enhancement document 612 may directly generate the feature or defect document 616 which opens the feature or defect object in TeamConnection 506.

As with the requirement document, the design documents, including the enhancement document, may have the states and authorities associated with them. These states and authorities provided by template 112 are as described below in Table 2.

TABLE 2

Design Document States

| Document State | Set By | Create Feature | Create Defect |
|---|---|---|---|
| Undefined | Author | No | No |
| Under Construction | Author | No | No |
| Under Review | Author | No | No |
| Review Complete | Author | Yes | Yes |
| Approved | Project Leader | Yes | Yes |
| Closed | Project Leader | No | No |
| Rejected | Project Leader | No | No |
| Deferred | Project Leader | No | No |

The differing states of a design document provided by the template 112 may be further customized within the Notes environment.

Figure 8:
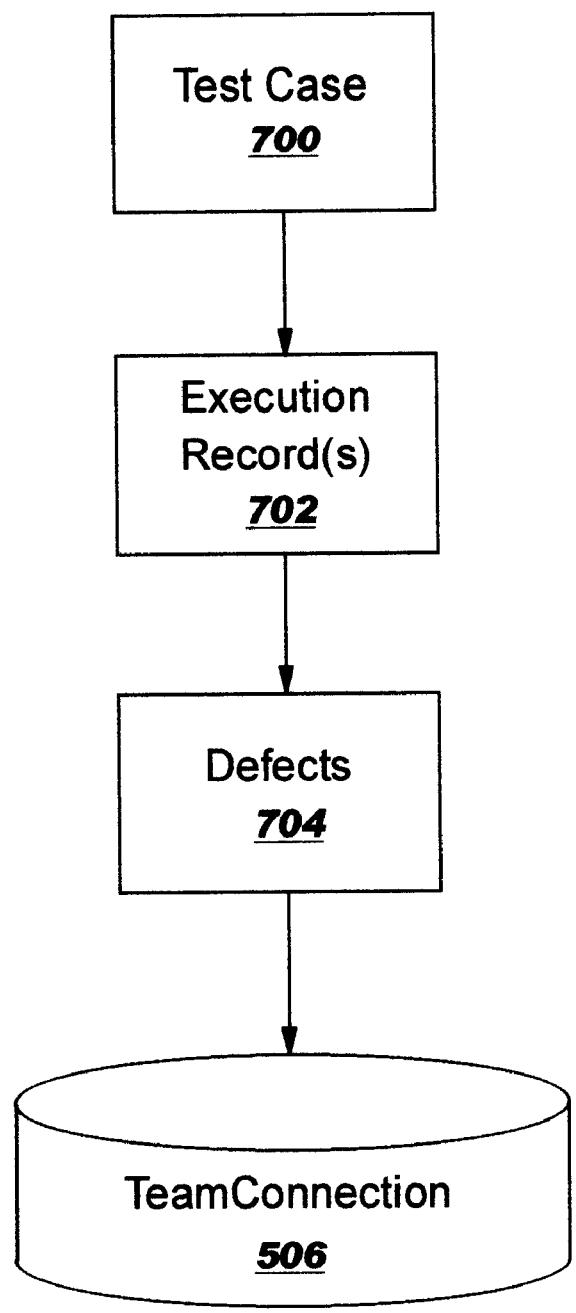
FIG. 8 is a flow diagram of test document generation and software library interaction for test documents utilizing the present invention.

FIG. 8 is a flow diagram of a test document 700 and illustrates how a test document may generate and be linked to an execution record or records 702 which may generate a defect document 704 which may open a defect object with TeamConnection 506. The test document and execution records may have the states and authorities as described in Table 3 and 4 below.

TABLE 3

Test Case States

| Test Case States | Set By |
|---|---|
| Undefined | Author |
| Under Construction | Author |
| Under Review | Author |
| Review Complete | Author |
| Approved | Project Leader |
| Ready | Author |
| Complete | Author |
| Obsolete | Author |

TABLE 4

Execution Record States

| Execution Record States | Set By | Create Defect |
|---|---|---|
| Not Run | Author | No |
| Not Ready | Author | No |
| Analysis | Author | Yes |
| Blocked | Author | Yes |
| Failed | Author | Yes |
| Rerun | Author | Yes |
| Success | Author | No |

As will be appreciated by those of skill in the art of workflow management, the test case state may be utilized to control the generation of execution records 702, such that an execution record may, for example, not be able to be generated until a test case is in a particular state, such as a review complete or approved state. Furthermore, as with the previous documents, the differing states of a test document, including an execution record, provided by the template 112 may be further customized within the Notes environment.

In addition to the document definitions provided by the template 112, the template 112 may also provided TeamConnection specific data such as family and port address information, component names used during feature and defect opens, user configurable fields for feature and defect opens and defect and feature attributes such as name, abstract, state, owner, severity and any user specified attributes.

Reconciliation operations are also provided to keep the Notes databases synchronized with TeamConnection. Such reconciliations may be run manually or automatically. The reconciliation refreshes each defect and feature with the latest data in TeamConnection and creates a log of details and exceptions to the reconciliation.

Figure 9:
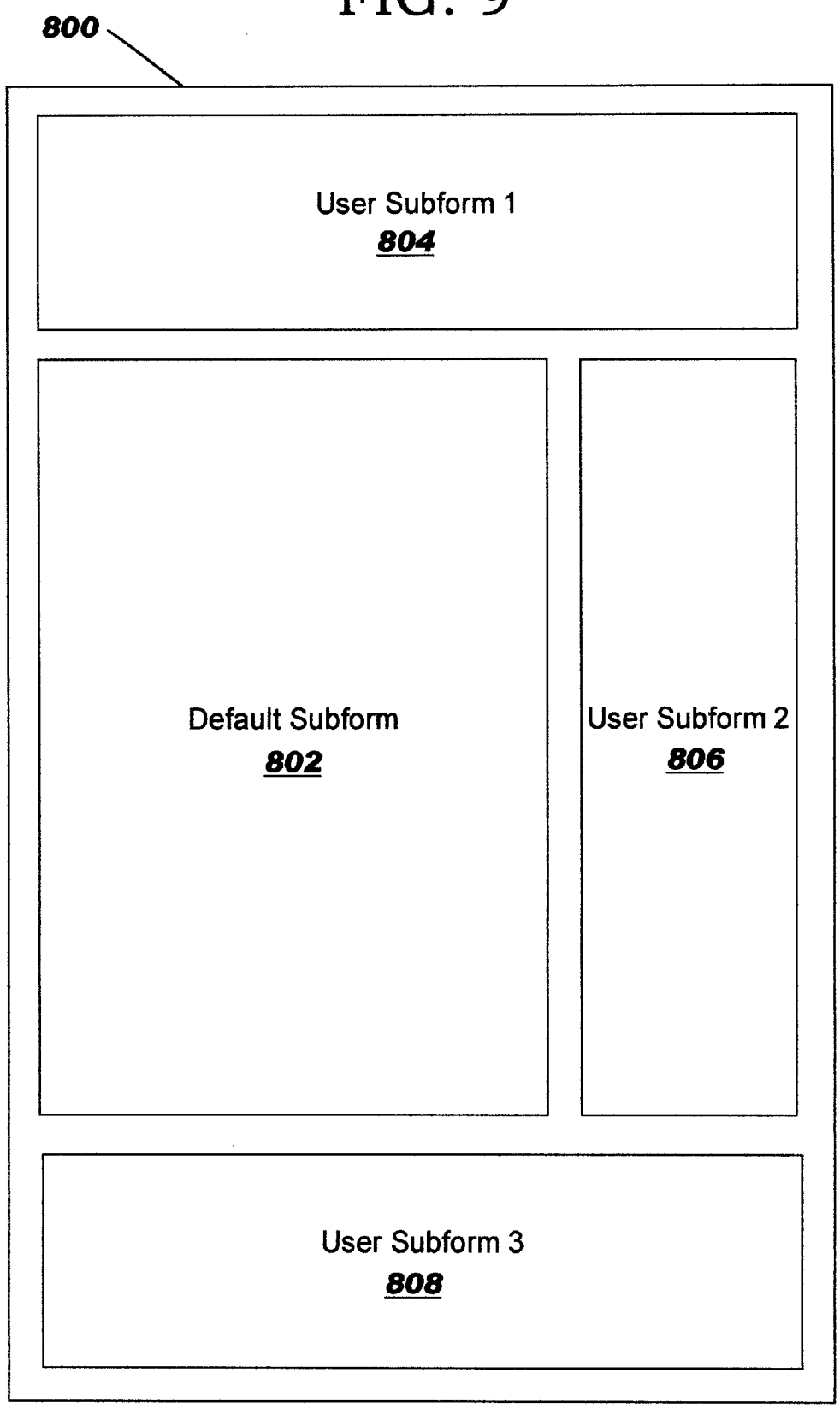
FIG. 9 is a diagram of a general form which may incorporated into a template according to the present invention.

Finally, the template 112 may provide forms for use with the databases. Such a generic form 800 is illustrated in FIG. 9. As seen in FIG. 9, the form 800 may include a default subform area 802 and user defined subform areas 804, 806 and 808. Using the Notes customization, these subforms may be rearranged, the contents copied to other subforms or the contents modified to incorporate portions of the default subform into the user defined subforms. Such modification techniques are known to those of skill in the art of workflow management and will not be described in detail herein.

It will be understood that each block of the flowchart and flow diagram illustrations, and combinations of blocks in the flowchart and flow diagram illustrations, can be implemented by computer program instructions. These program instructions may be provided to a processor to produce a machine, such that the instructions which execute on the processor create means for implementing the functions specified in the flowchart or flow diagram block or blocks. The computer program instructions may be executed by a processor to cause a series of operational steps to be performed by the processor to produce a computer implemented process such that the instructions which execute on the processor provide steps for implementing the functions specified in the flowchart or flow diagram block or blocks.

Accordingly, blocks of the flowchart or flow diagram illustrations support combinations of means for performing the specified functions, combinations of steps for performing the specified functions and program instruction means for performing the specified functions. It will also be understood that each block of the flowchart or flow diagram illustrations, and combinations of blocks in the flowchart or flow diagram illustrations, can be implemented by special purpose hardware-based systems which perform the specified functions or steps, or combinations of special purpose hardware and computer instructions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of providing a document management system suitable for incorporation with a software management and control library, the method comprising:

encapsulating a plurality of document databases with a template so as to provide a document database which interacts with the software management and control library; and wherein the template defines interactions between the document database and the software management and control library so as to control linking of a document in the plurality of document databases to objects of the software management and control library based on a particular one of the plurality of document databases associated with the document being linked.

2. A method according to claim 1, wherein the encapsulating step comprises the step of defining the plurality of document databases utilizing the template.

3. A method according to claim 1, wherein the template is a Lotus Notes template.

4. A method of providing a document management system suitable for incorporation with a software management and control library, the method comprising:

encapsulating a plurality of document databases with a template so as to provide a document database which interacts with the software management and control library by defining the plurality of document databases utilizing the template by:

defining a requirments documents database;

defining a design and development document database; and defining a test document database.

5. A method according to claim 4, wherein the step of defining a requirements document database further comprises the steps of:

defining a requirements document for storing requirements information in the requirements document database; and defining a feature document for storing in the requirements document database feature information associated with requirements documents stored in the requirements document database.

6. A method of providing a document management system suitable for incorporation with a software management and control library, the method comprising:

encapsulating a plurality of document databases with a template so as to provide a document database which interacts with the software management and control library by defining the plurality of document databases utilizing the template, wherein defining the plurality of document databases comprises:

defining a requirements document database;

defining a design and development document database; and defining a test document database;

wherein defining the requirements document database further comprises the steps of:

defining a requirements document for storing requirements information in the requirements document database; and defining a feature document for storing in the requirements document database feature information associated with requirements documents stored in the requirements document database; and wherein the step of defining a design and development document database further comprises the steps of:

defining a design document for storing design information in the design and development document database;

defining a low level design document for storing additional design information associated with design documents in the design and development database;

defining a change document for storing design change information associated with at least one of a design document and a low level design document stored in the design and development database; and defining a feature document for storing in the design and development document database, feature information associated with at least one of design documents, low level design documents and change documents stored in the design and development database.

7. A method according to claim 6, wherein the step of defining a test document database further comprises the steps of:
- defining a test case document for storing test case information in the test case document database;
- defining an execution record document for storing in the test document database, execution information associated with a test case document stored in the test document database; and
- defining a defect document for storing in the test document database, defect information associated with execution records stored in the test document database.

8. A method according to claim 7, wherein each of the defined documents comprises a document definition including a link field for associating documents created by the definition with another document.

9. A method according to claim 7, wherein the encapsulating step further comprises the step of defining a plurality of user authority levels associated with the plurality of document databases, wherein the plurality of user authority levels define access and control rights associated with documents stored in the plurality of databases.

10. A method according to claim 9, further comprising the steps of:
- defining a plurality of allowed status states for at least one document definition for at least one of the requirement documents database, the design and development documents database and the test database; and
- defining actions allowed for documents created using the at least one document definition so as to control the allowed actions based on a combination of the status state of the created document and a user authority level associated with a user accessing the created document.

11. A method according to claim 7, further comprising the step of defining a form format for use in accessing documents from each of the plurality of databases.

12. A method according to claim 11, wherein the form format comprises at least one predefined subform and at least one user defined subform.

13. A database management and control system, comprising:
- a plurality of databases; and
- means for encapsulating selected ones of the plurality of databases with a template so as to provide a database which interacts with the database management and control system; and
- wherein the template defines interactions between the document database and the software management and control library so as to control linking of a document in the plurality of document databases to objects of the software management and control library based on a particular one of the plurality of document databases associated wit the document being linked.

14. A system according to claim 13, wherein the encapsulating means comprises means for defining the plurality of databases utilizing the template.

15. A database management and control system comprising:
- a plurality of databases; and
- means for encapsulating selected ones of the plurality of databases with a template so as to provide a database which interacts with the database management and control system wherein the encapsulating means comprises means for defining the plurality of databases utilizing the template; and
- wherein the plurality of databases relate to a software management and control library, the defining means comprising:
    - means for defining a requirements document database;
    - means for defining a design and development document database; and
    - means for defining a test document database.

16. A system according to claim 15, wherein the means for defining a requirements document database further comprises:
- means for a requirements document for storing requirements information in the requirements document database; and
- means for defining a feature document for storing in the requirements document database feature information associated with requirements documents stored in the requirements document database.

17. A database management and control system, comprising:
- a plurality of databases;
- means for encapsulating selected ones of the plurality of databases with a template so as to provide a database which interacts with the database management and control system, wherein the means for encapsulating comprises means for defining the plurality of databases utilizing the template and wherein the plurality of databases relate to a software management and control library, the defining means comprising:
    - means for defining a requirements document database;
    - means for defining a design and development document database; and
    - means for defining a test document database;
    - wherein the means for defining a requirements document database further comprises:
        - means for a requirements document for storing requirements information in the requirements document database; and
        - means for defining a feature document for storing in the requirements document database feature information associated with requirements documents stored in the requirements document database; and
    - wherein the means for defining a design and development document database further comprises:
        - means for defining a design document for storing design information in the design and development document database;
        - means for defining a low level design document for storing additional design information associated with design documents in the design and development database;
        - means for defining a change document for storing design change information associated with at least one of a design document and a low level design document stored in the design and development database; and
        - means for defining a feature document for storing in the design and development document database, feature information associated with at least one of design documents, low level design documents and change documents stored in the design and development database.

18. A system according to claim 17, wherein the means for defining a test document database further comprises:
- means for defining a test case document for storing test case information in the test case document database;

means for defining an execution record document for storing in the test document database, execution information associated with a test case document stored in the test document database; and means for defining a defect document for storing in the test document database, defect information associated with execution records stored in the test document database.

19. A computer program product for database management and control, the computer program product comprising a computer-readable medium having computer-readable program code embodied in the medium, the computer-readable program code means comprising:

a plurality of databases; and computer-readable program code means for encapsulating selected ones of the plurality of databases with a template so as to provide a database which interacts with the database management and control system; and wherein the template defines interactions between the document database and the software management and control library so as to control linking of a document in the plurality of document databases to objects of the software management and control library based on a particular one of the plurality of document databases associated with the document being linked.

20. A computer program product according to claim 19, wherein the computer-readable program code means for encapsulating comprises computer-readable program code means for defining the plurality of databases utilizing the template.

21. A computer program product for database management and control, the computer program product comprising a computer-readable medium having computer-readable program code embodied in the medium, the computer-readable program code means comprising:

a plurality of databases; and computer-readable program code means for encapsulating selected ones of the plurality of databases with a template so as to provide a database which interact with the database management and control system wherein the encapsulating means comprises computer-readable program code means for defining the plurality of databases utilizing the template; and wherein the plurality of databases relate to a software management and control library, the defining means comprising:

computer-readable program code means for defining a requirements document database;

computer-readable program code means for defining a design and development document database; and computer-readable program code means for defining a test document database.

22. A computer program product according to claim 21, wherein the means for defining a requirements document database further comprises:

computer-readable program code means for a requirements document for storing requirements information in the requirements document database; and computer-readable program code means for defining a feature document for storing in the requirements document database feature information associated with requirements documents stored in the requirements document database.

23. A computer program product for database management and control, the computer program product comprising a computer-readable medium having computer-readable program code embodied in the medium, the computer-readable program code means comprising:

a plurality of databases that relate to a software management and control library; and computer-readable program code means for encapsulating selected ones of the plurality of databases with a template so as to provide a database which interacts with the database management and control system, wherein the computer-readable program code means for encapsulating comprises computer-readable program code means for defining the plurality of databases utilizing the template and wherein the computer-readable program code means for defining the plurality of databases comprises:

computer-readable program code means for defining a requirements document database;

computer-readable program code means for defining a design and development document database; and computer-readable program code means for defining a test document database; and wherein the computer-readable program code means for defining a requirements document database further comprises:

computer-readable program code means for defining a requirements document for storing requirements information in the requirements document database; and computer-readable program code means for defining a feature document for storing in the requirements document database feature information associated with requirements documents stored in the requirements document database; and wherein the computer-readable program code means for defining a design and development document database further comprises:

computer-readable program code means for defining a design document for storing design information in the design and development document database;

computer-readable program code means for defining a low level design document for storing additional design information associated with design documents in the design and development database;

computer-readable program code means for defining a change document for storing design change information associated with at least one of a design document and a low level design document stored in the design and development database; and computer-readable program code means for defining a feature document for storing in the design and development document database, feature information associated with at least one of design documents, low level design documents and change documents stored in the design and development database.

24. A computer program product according to claim 23, wherein the computer-readable program code means for defining a test document database further comprises:

computer-readable program code means for defining a test case document for storing test case information in the test case document database;

computer-readable program code means for defining an execution record document for storing in the test document database, execution information associated with a test case document stored in the test document database; and computer-readable program code means for defining a defect document for storing in the test document database, defect information associated with execution records stored in the test document database.

* * * * *